United States Patent
Saund et al.

(10) Patent No.: US 8,452,086 B2
(45) Date of Patent: May 28, 2013

(54) SYSTEM AND USER INTERFACE FOR MACHINE-ASSISTED HUMAN LABELING OF PIXELS IN AN IMAGE

(75) Inventors: Eric Saund, San Carlos, CA (US); Jing Lin, Saratoga, CA (US); Prateek Sarkar, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 974 days.

(21) Appl. No.: 12/500,928

(22) Filed: Jul. 10, 2009

(65) Prior Publication Data

US 2011/0007964 A1    Jan. 13, 2011

(51) Int. Cl.
*G06K 9/34* (2006.01)

(52) U.S. Cl.
USPC .......................................... 382/164; 715/810

(58) Field of Classification Search
None
See application file for complete search history.

(56) References Cited

U.S. PATENT DOCUMENTS

| | | | |
|---|---|---|---|
| 5,181,255 A | 1/1993 | Bloomberg |
| 5,201,011 A | 4/1993 | Bloomberg et al. |
| 5,202,933 A | 4/1993 | Bloomberg |
| 5,369,714 A | 11/1994 | Withgott et al. |
| 5,570,435 A | 10/1996 | Bloomberg et al. |
| 5,778,092 A | 7/1998 | MacLeod et al. |
| 5,892,842 A | 4/1999 | Bloomberg |
| 5,956,468 A | 9/1999 | Ancin |
| 6,009,196 A | 12/1999 | Mahoney |
| 6,301,386 B1 | 10/2001 | Zhu et al. |
| 6,377,710 B1 | 4/2002 | Saund |
| 6,411,733 B1 | 6/2002 | Saund |
| 6,587,583 B1 | 7/2003 | Kurzweil et al. |
| 6,771,816 B1 | 8/2004 | Gaither |
| 6,903,751 B2 | 6/2005 | Saund et al. |
| 7,036,077 B2 | 4/2006 | Saund et al. |
| 7,079,687 B2 | 7/2006 | Guleryuz |
| 7,086,013 B2 | 8/2006 | Saund et al. |
| 7,136,082 B2 | 11/2006 | Saund et al. |
| 7,177,483 B2 | 2/2007 | Saund |
| 7,379,594 B2 | 5/2008 | Ferman et al. |
| 7,570,816 B2 * | 8/2009 | Bargeron et al. ............. 382/224 |

(Continued)

OTHER PUBLICATIONS

Saund et al., "PixLabeler: User Interface for Pixel-Level Labeling of Elements in Document Images", Document Analysis and Recognition, 2009, pp. 646-650, ICDAR '09 10th International Conference, Made Available Jul. 26, 2009.*

(Continued)

*Primary Examiner* — Bhavesh Mehta
*Assistant Examiner* — Tahmina Ansari
(74) *Attorney, Agent, or Firm* — Fay Sharpe LLP

(57) ABSTRACT

A user interface and method is embodied on a computer readable medium and executable on a computer. The user interface is a labeler which labels only foreground pixels of an image stored in a computing environment. The labeler operates in a Region mode/state and Brush mode/state, and includes a Tentative mode that permits an assigned label to be changed after pixels have been selected. Groups of pixels may be selected for labeling at once by a point-and-click command, and a pixel may belong to one or more groups of pixels which are stored in memory as image layers. The groups are formed dynamically by user selection actions, and/or through automatic recognition algorithms. Pixels already labeled with certain labels may be locked to not be altered by additional labeling operations. Unassigned pixels may be highlighted to increase the ease at which they are identified in an image. Comparisons between labeled images are undertaken to indicate differences between different groundtruth labeling.

23 Claims, 20 Drawing Sheets

U.S. PATENT DOCUMENTS

| | | | |
|---|---|---|---|
| 7,783,117 | B2 | 8/2010 | Liu et al. |
| 7,792,353 | B2 | 9/2010 | Forman et al. |
| 7,899,258 | B2 | 3/2011 | Liu et al. |
| 7,907,778 | B2 | 3/2011 | Xiao et al. |
| 7,936,923 | B2 | 5/2011 | Liu et al. |
| 7,958,068 | B2 | 6/2011 | Smith et al. |
| 8,171,392 | B2 | 5/2012 | Bastos dos Santos et al. |
| 8,180,112 | B2 * | 5/2012 | Kurtz et al. .................. 382/108 |
| 2006/0002623 | A1 | 1/2006 | Dolan et al. |
| 2006/0222239 | A1 * | 10/2006 | Bargeron et al. ............ 382/159 |
| 2007/0009153 | A1 * | 1/2007 | Gallafent et al. ............ 382/173 |
| 2008/0002887 | A1 * | 1/2008 | Revow ......................... 382/187 |
| 2008/0175507 | A1 * | 7/2008 | Lookingbill et al. ......... 382/255 |
| 2008/0267497 | A1 | 10/2008 | Fan |
| 2009/0185723 | A1 * | 7/2009 | Kurtz et al. .................. 382/118 |
| 2010/0040285 | A1 | 2/2010 | Csurka et al. |
| 2011/0007366 | A1 | 1/2011 | Sarkar et al. |
| 2011/0007964 | A1 * | 1/2011 | Saund et al. ................. 382/162 |
| 2011/0007970 | A1 | 1/2011 | Saund |

OTHER PUBLICATIONS

Kavallieratou et al., Handwritten text localization in skewed documents, ICIP, pp. 1102-1105, 2001.

Kavallieratou et al., "Machine-printed from handwritten text discrimination", IWFHR-9, pp. 312-316, 2004.

Kuhnke et al., "A system for machine-written and hand-written character distinction", ICDAR, pp. 811-814, 1995.

Li et al., A new algorithm for detecting text line in handwritten documents, IWFHF, pp. 35-40, 2006.

Manmatha et al., "A scale space approach for automatically segmenting words from historical handwritten documents", IEEE, TPAMI, 27(8):1212-1225, Aug. 2005.

Okun et al., "Automatic ground-truth generation for skew-tolerance evaluation of document layout analysis methods", ICPR, pp. 376-379, 2000.

Shafait et al., "Pixel-accurate representation and evaluation of page segmentation in document images", ICPR, pp. 872-875, 2006.

Shetty, et al., "Segmentation and labeling of documents using conditional random fields", Proc. SPIE, 6500, 2007.

Wenyin et al., "A protocol for performance evaluation of line detection algorithms", Machine Vision and Applications, 9:240-250, 1997.

Yacoub et al., "A ground truthing environment for complex documents", DAS, pp. 452-456, 2005.

Zi et al., "Document image ground truth generation from electronic text", ICPR, pp. 663,666, 2004.

Zotkins et al., "Gedi: Groundtruthing environment for document images", http://lampsrv01.umiacs.umd.edu/projdb/project.php?id-53.

Bal et al., "Interactive degraded document enhancement and ground truth generation", DAS, 2008.

Moll et al., "Truthing for pixel-accurate segmentation", DAS 2008, 2008.

Pal et al., "Machine-printed and handwritten text lines identification", Pall. Rec. Lett., 22(3-4):431, 2001.

Zheng et al., "Machine Printed Text and Handwriting Identification in Noisy Document Images", IEEE Trans. Pattern Anal. Mach. Intell., 26(3):337-353, 2004.

Chen et al., "Image Objects and Multi-Scale Features for Annotation Detection", in Proceedings of Int'l Conf. on Pattern Recognition, Tampa Bay, FL, 2008.

Koyama et al., "Local-Spectrum-Based Distinction Between Handwritten and Machine-Printed Characters", in Proceedings of the 2008 IEEE Int'l Conf. on Image Processing, San Diego, CA, Oct. 2008.

Breuel, "Segmentation of Handprinted Letter Strings Using a Dynamic Programming Algorithm", in Proceedings of 6th Int'l Conf. on Document Analysis and Recognition, pp. 821-826, 2001.

Freund et al., "A Decision-Theoretic Generalization of On-Line Learning and an Application to Boosting", in European Conf. on Computational Learning Theory, pp. 23-27, 1995.

Ha et al., "The Architecture of Trueviz: A Groundtruth/Metadata Editing and Visualizing Toolkit", Pattern Recognition, 36(3):811-825, 2003.

Yang et al., "Semi-Automatic Grountdruth Generation for Chart Image Recognition", DAS, pp. 324-335, 2006.

Saund et al., "Perceptually-Supported Image Editing of Text and Graphics", ACM UISTI, pp. 183-192, 2003.

Huang et al., "User-Assisted Ink-Bleed Correction for Handwritten Documents", Joint Conference on Digital Libraries, 2008.

OpenCV, Internet website http://opencv.willowgarage.com/wiki/, last edited Mar. 18, 2009.

Evans et al., "Computer Assisted Interactive Recognition (CAVIAR) Technology", IEEE Int'l Conf. Electro-Information Technology, 2005.

Roth et al., "Ground Truth Editor and Document Interface", Summit on Arabic and Chinese Handwriting, 2006.

An et al., "Iterated document content classification", in Int'l Conf. Doc. Analysis & Recognition, vol. 1, pp. 252-256, Los Alamitos, CA, 2007.

Fan, et al., "Classification of machine-printed and handwritten texts using character block layout variance.", Pattern Recognition, 31(9):1275-1284, 1998.

Liang, et al., "Document image restoration using binary morphological filters", in Proc. SPIE Conf. Document Recognition, pp. 274-285, 1996.

Ford, et al., "Ground truth data for document image analysis", Symposium on Document Image Understanding and Technology, 2003.

Gatos et al., "ICDAR2007 handwriting segmentation contest", ICDAR, pp. 1284-1288, 2007.

Guo et al., "Separating handwritten material from machine printed text using hidden Markov models", Proc. ICDAR, pp. 439-443, 2001.

Guyon et al., "Data sets for OCR and document image understanding research", Proc. SPIE-Document Recognition IV, 1997.

Houle et al., "Handwriting stroke extraction using a new xytc transform", Proc. ICDAR, pp. 91-95, 2001.

* cited by examiner

SYSTEM AND USER INTERFACE FOR MACHINE-ASSISTED HUMAN LABELING OF PIXELS IN AN IMAGE

CROSS REFERENCE TO RELATED PATENTS AND APPLICATIONS

Commonly assigned applications, U.S. Publication No. 20110007970A1, to Saund, entitled, "System And Method For Segmenting Text Lines In Documents"; and U.S. Publication No. 20110007366A1, to Prateek et al., entitled, "System And Method For Classifying Connected Groups Of Foreground Pixels In Scanned Document Images According To The Type Of Marking", are each incorporated herein by reference in their entirety.

BACKGROUND

The present application is related to image processing and more particularly to generating original groundtruthed images at the level of pixels.

The need for groundtruth is pervasive in document image analysis to train machine learning based algorithms and to evaluate algorithm performance. However, groundtruth data can be difficult to obtain. It is tedious and time-consuming to produce and relies on formats and standards that differ from research group to research group. The lack of abundant and high quality groundtruth data is seen as an impediment to improvements in various areas of image processing. Evidencing this state of affairs is that commercial OCR companies view their databases of groundtruthed documents as competitive assets.

Today groundtruthing is performed primarily by two means. The dominant approach is to perform groundtruthing in terms of enclosures. Largely as a matter of expediency, most enclosure groundtruthing focuses on labeling rectangular regions, as it is relatively straightforward to devise a user interface for dragging rectangles color coded according to label type. Another enclosure type groundtruthing process employs polygonal regions as the enclosing mechanism.

A second groundtruthing approach is to use a standard image editing tool such as Microsoft Paint or Adobe Photoshop to label images on a pixel basis. For example the brush action of these tools may be employed for the groundtruthing operation. However, this approach is tedious, imprecise and rapidly becomes very labor intensive.

Previous document image groundtruthing tools are discussed in L. C. Ha et al., "The Architecture Of Trueviz: A Groundtruth/Metada Editing And Visualizing Toolkit", *Pattern Recognition*, 36(3):811-825, 2003, which uses the layout and visual structure in document images. Another, groundtruthing tool is described by Yang, et al., "Semi-Automatic Groundtruth Generation For Chart Image Recognition", *DAS*, pages 324-335, 2006.

A new tool and method which eases the tedium and time to obtain groundtruth data is considered beneficial.

INCORPORATION BY REFERENCE

Commonly assigned applications, U.S. Publication No. 20110007970A1, to Saund, entitled, "System And Method For Segmenting Text Lines In Documents"; and U.S. Publication No. 20110007366A1, to Prateek et al., entitled, "System And Method For Classifying Connected Groups Of Foreground Pixels In Scanned Document Images According To The Type Of Marking", are each incorporated herein by reference in their entirety.

BRIEF DESCRIPTION

A user interface and method is embodied on a computer readable medium and executable on a computer. The user interface is a labeler which labels only foreground pixels of an image stored in a computing environment. The labeler operates in a Region mode/state and Brush mode/state, and includes a Tentative mode that permits an assigned label to be changed after pixels have been selected. Groups of pixels may be selected for labeling at once by a point-and-click command, and a pixel may belong to one or more groups of pixels which are stored in memory as image layers. The groups are formed dynamically by user selection actions, and/or through automatic recognition algorithms. Pixels already labeled with certain labels may be locked to not be altered by additional labeling operations. Unassigned pixels may be highlighted to increase the ease at which they are identified in an image. Comparisons between labeled images are undertaken to indicate differences between different groundtruth labelings.

DETAILED DESCRIPTION

Figure 1:
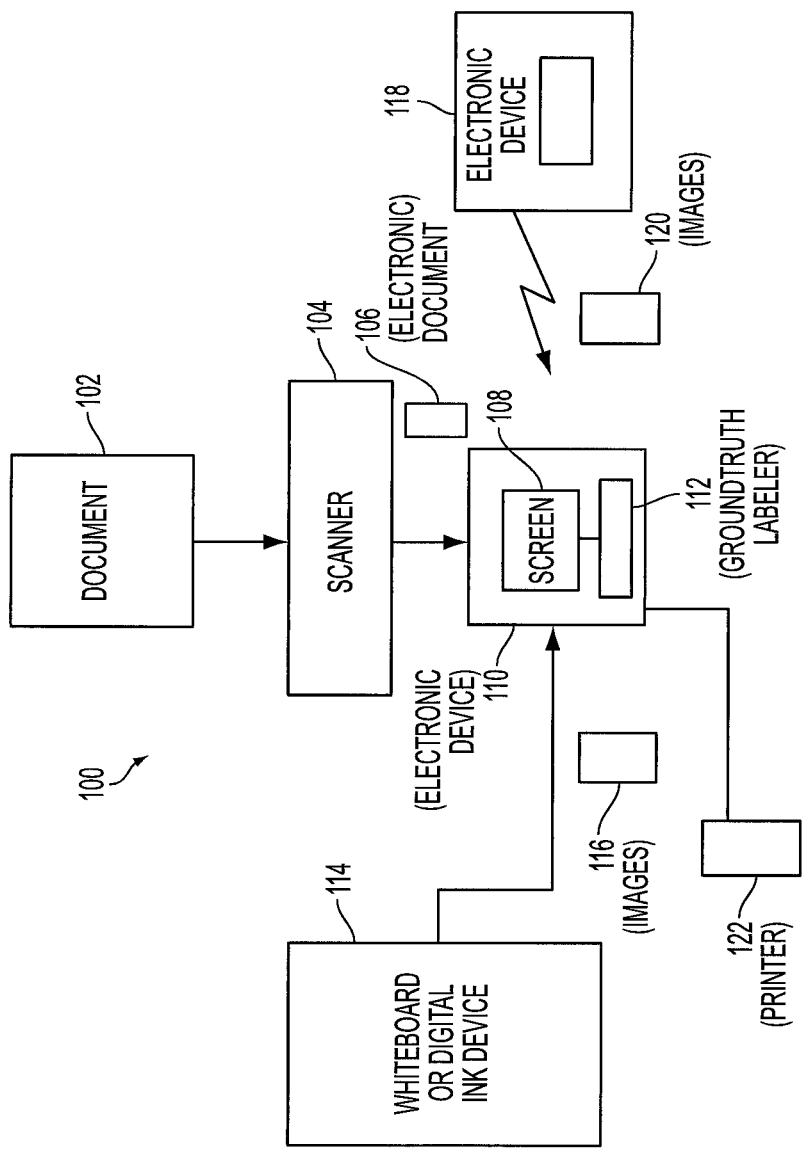
FIG. 1 is a system diagram of an environment in which the concepts of the present application are implemented.

Depicted in FIG. 1 is a system 100 in which the concepts of the present application may be implemented. System 100 illustrates various channels by which digitized bitmapped images and/or images formed by digital ink techniques are input for the purpose of groundtruth labeling.

More particularly, a hardcopy of a document carrying images 102 is input to a scanner 104 which converts or transforms the images of document 102 into an electronic document of the images 106. While not being limited thereto, the images on hardcopy document 102 may be created by electronic data processing devices, by pens, pencils, or other non-electronic materials, or by stamps both electronic and manual. The electronic document 106 is displayed on a screen 108 of a computer, personal digital system or other electronic device 110, which includes a groundtruth labeler 112 of the present application. The electronic device 110 includes at least one processor and sufficient electronic memory storage to operate the groundtruth system 112. The groundtruth labeler may be embodied as software stored on memory of electronic device 110 and operation by a processor of the electronic device 110. The groundtruth labeler 112, may be implemented in the form of a user interface, that is controlled by operation of a mouse, keyboard or other user interface of the electronic device 110. It is understood electronic device 110 shown in FIG. 1 includes such input/output devices.

Alternatively, a whiteboard or digital ink device 114 may be coupled to electronic device 110, whereby bitmapped or digital ink images 116 are electronically transmitted to device 110. Another channel by which bitmapped or digital ink images may be provided to the groundtruth labeler 112, is through use of another electronic device 118. This device can be any of a number of systems, including but not limited to a computer, a computerized CAD system, a server on the Internet which delivers web pages, or any other system which an electronic tablet, personal digital assistant (PDA), provides bitmapped and/or digital ink images 120 to labeler 112. Further, image generation software, loaded on electronic device 110, can be used to generate a bitmapped or digital ink image for use by labeler system 112. A finalized version of the electronic document with images processed by the labeler system 112 is stored in the memory storage of the computer system 110, sent to another electronic device 118, printed out in hardcopy form by a printer 122 or printed out from printing capabilities associated with converter/scanner 104.

It is to be appreciated that while the foregoing discussion explicitly states a variety of channels to generate the images, concepts of the present application will also work with images on documents obtained through other channels as well.

Groundtruth labeler 112, which labels at a pixel level, includes a set of user interface techniques. Labeler 112 presents a user with an image of the document to be labeled. The document can be bitonal, greyscale, or color, and the document images are characterized by structure that lend themselves to the use of accelerated user interface commands and techniques, so that large collections of like-label pixels can be tagged together, with few user operations. The user interface actions of labeler 112 include dual enclosure/brush selection region/modes, a tentative labeling state, grouping of pixels through layers, automatic grouping by structure recognition, bootstrapping with task-specific programs, and tools for comparison of groundtruth produced by multiple users.

In one embodiment the different marking types on an image are identified by different overlay colors. For example, in a binarized form containing a signature, a groundtruthing task may color the pixels comprising the form's signature line in blue (representing "machine print line graphics") and the handwritten signature in red (representing "handwritten text"). It is noted that while the use of colors is one manner of distinguishing between the different types of markings in a document, other identifiers may also be used, including different grey scale, and distinct patterns (e.g., dotted lines, cross-hatching, dot-dash patterns, etc.), among other identifiers.

Turning now to various aspects of the present labeler user interface.

1. User Interface Design

1a. Region and Brush Modes

Documents are dominated by foreground markings set against a relatively uniform white or other color background. Labeler 112 labels only foreground pixels, not background. Thus the first step of the process is to separate color, grey scale, or bitonal-black foreground markings from background, using well established image processing techniques. By these techniques, background pixels are treated as immutable "white" and will not have an identifier (e.g., color) attached.

In one embodiment, foreground/background separation is done by regarding all white pixels in a bitonal image as background, or, in a greyscale or color image, by thresholding and labeling all resulting white pixels as background. In a more advanced implementation, various existing image processing steps could be applied to determine non-white background regions, such as used described in U.S. Pat. No. 7,177,483, "System and method for enhancement of document images", incorporated herein in its entirety.

A menu (e.g., pop-up menu 200 of FIG. 2) of labeler 200 may be activated, which in one embodiment occurs with a click of the right mouse button. Menu 200 presents selection options for a number of labels and associated colors that will overlay foreground pixels.

In the following discussion, much of the material is related to particular colors. Colors are identified by number identifiers in this description. However, it is to be understood in implementations, the actual colors themselves would be shown on the screen and as part of the images.

Figure 2:
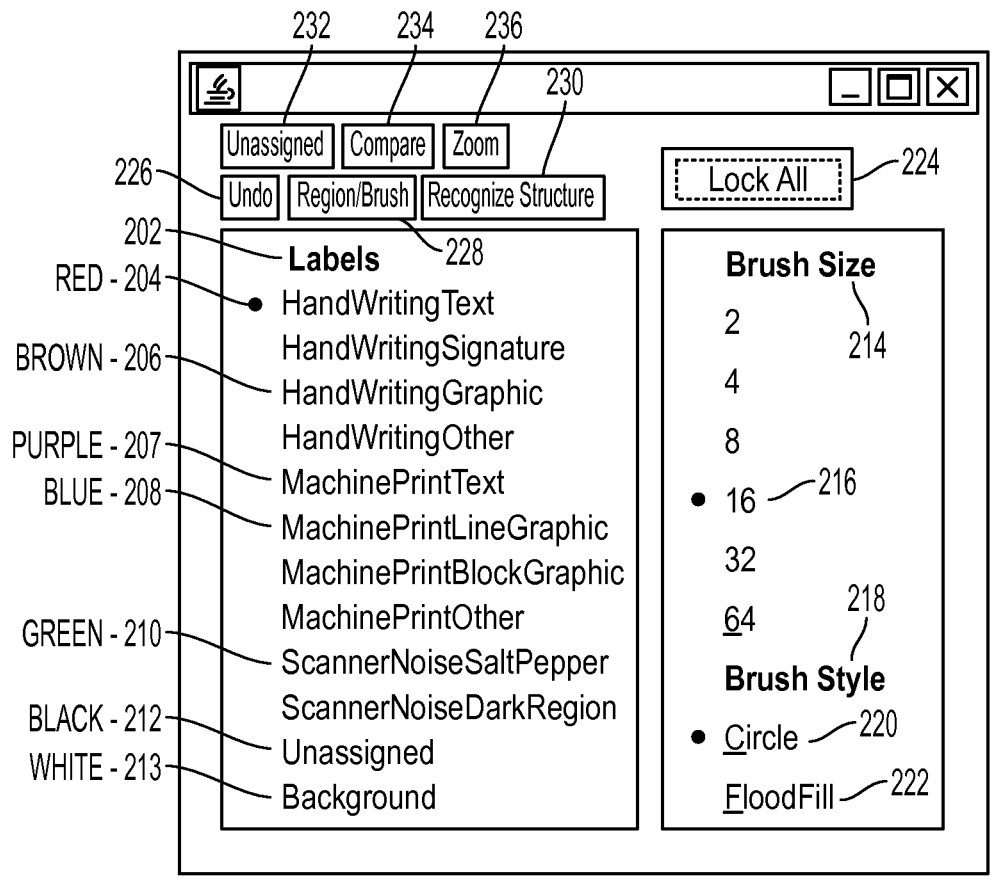
FIG. 2 is a pop-up menu of a groundtruth labeler of the present application.
Figure 3:
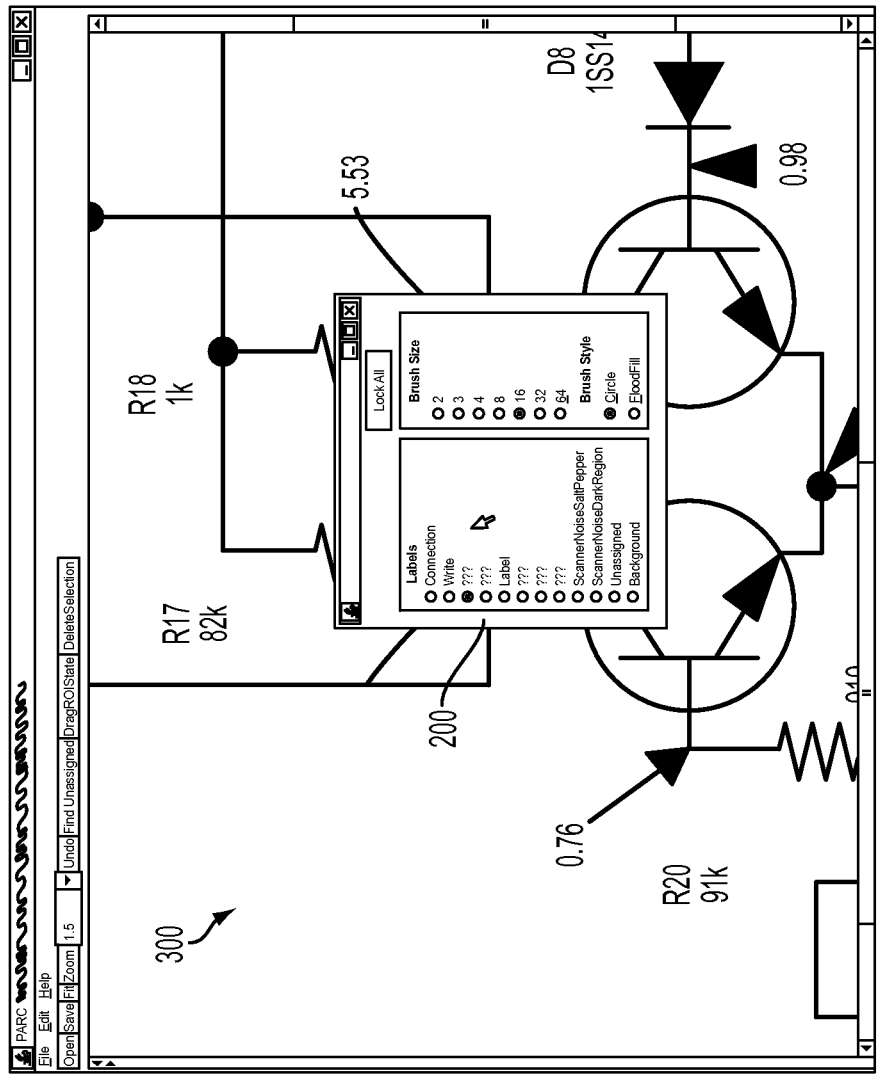
FIGS. 3-15 depict the operation of the pixel labeler.

For example, with regard to menu 200 of FIG. 2, a user may select labels 202, such as to identify handwriting text (e.g., colored red) 204, handwritten graphic (e.g., brown) 206, machine printed text 207 (e.g., purple-207), machine print line graphics (e.g., blue) 208, scanner noise salt and pepper (e.g., green) 210. Other labels are identified as unassigned (e.g., black) 212 and background (e.g., white) 213. It is to be appreciated other label designations are set forth in the list under labels 202, with each having different colors to designate that marking type label in an image. However, for clarity of the drawing, not all labels are numbered. Also shown on menu 200 is a brush size selector 214, which allows different size brushes to be selected. In this instance, the user has selected a size "16" brush 216. Similarly, the brush style 218 may be selected between either a circle or flood-fill style, where in this instance the circle 220 is selected and not the flood-fill style 222. Menu 200 also includes a "Lock All" button 224, an "Undo" button 226, "Region/Brush" button 228, "Unassigned" button 232, "Compare" button 234 and "Zoom" button 236. Label descriptions and their colors in one embodiment are set by a user-editable XML configuration file. When in use, and as shown in FIG. 3, menu 200 may pop up directly on an image 300 for which groundtruth processing is to take place.

The user interface exists in one of two primary modes or states. In Region mode, the user drags the mouse to select regions of the image by enclosure. A technique called overloaded loop selection, first introduced by Saund et al., "Perceptually-Supported Image Editing Of Text And Graphics," *ACM UISTI*, pages 183-192, 2003 (incorporated herein by reference), permits selection by rectangle or lasso without prior selection of which tool is desired.

Figure 4:
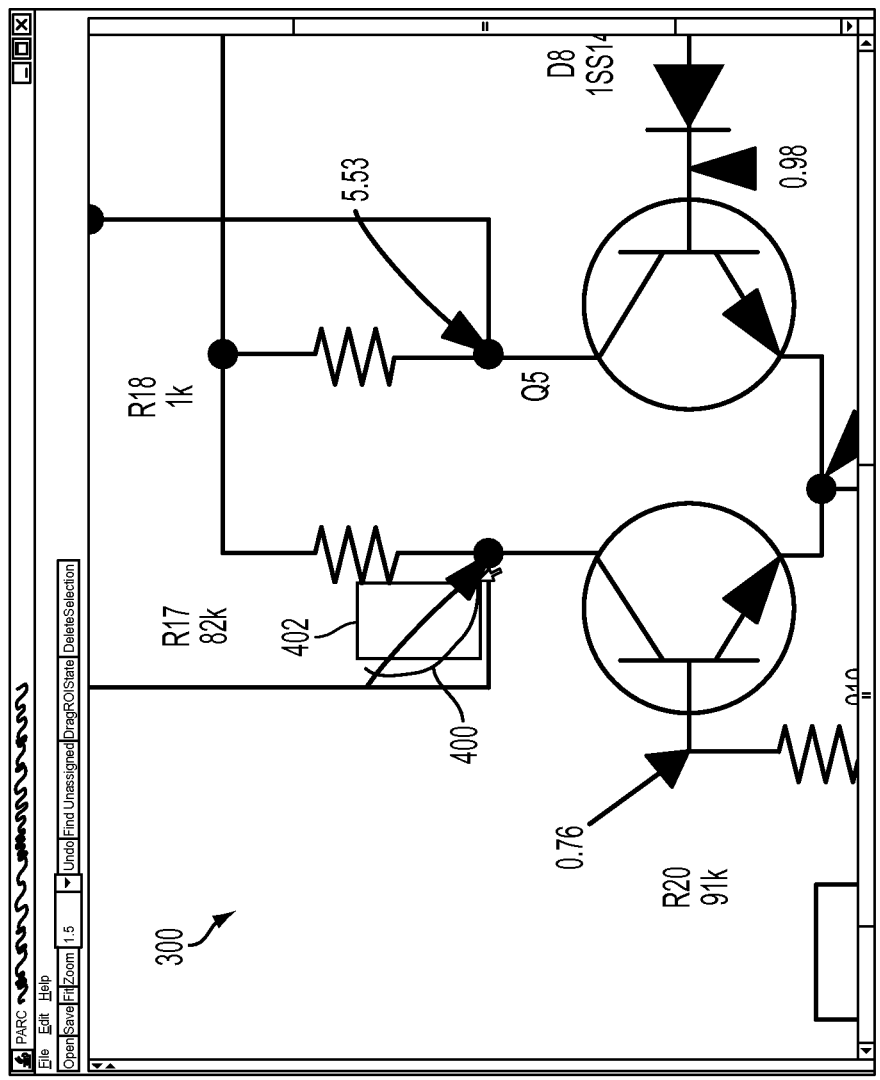
Figure 5:
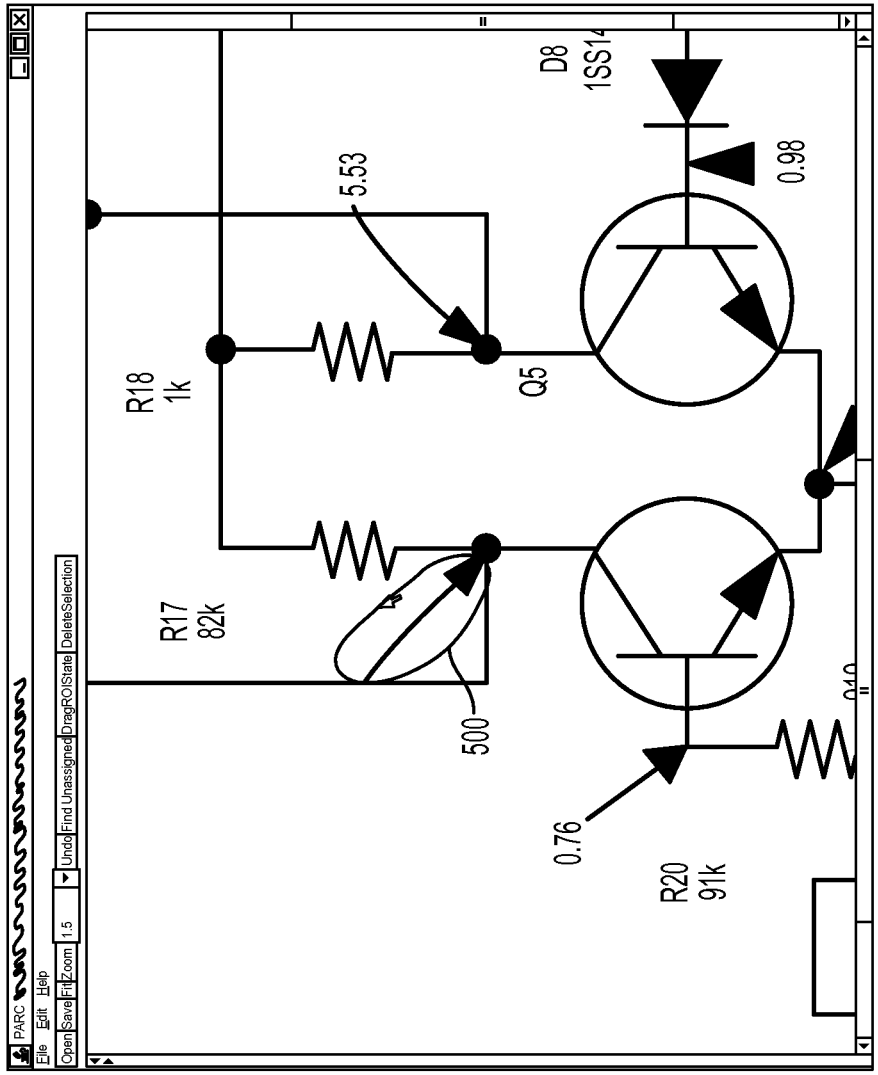
Figure 6:
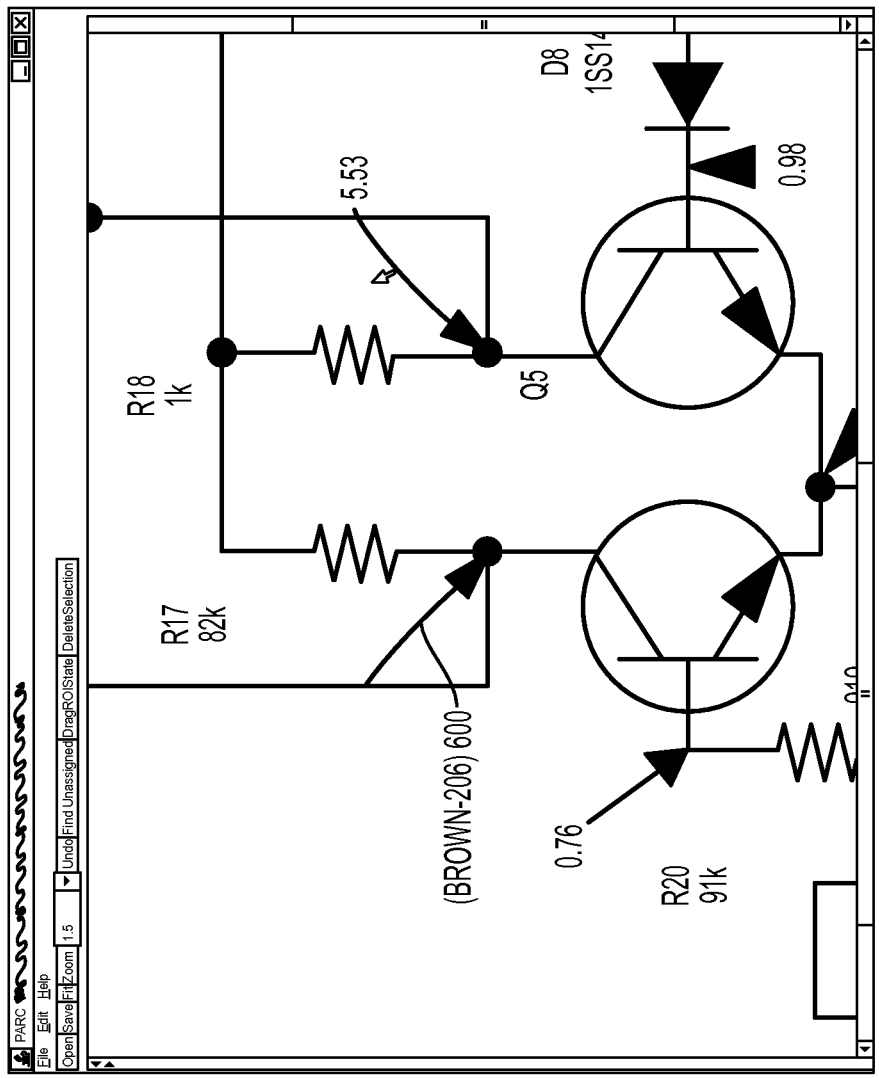

As illustrated in FIG. 4, while dragging the mouse with the left button pressed, either a selection rectangle or lasso is dynamically indicated depending on the shape of the user's drag. As the user is dragging along arc 400, the system initially understands this to be a movement for rectangle 402. However, as the lasso enclosure 400 is completed more fully, the lasso 500 will be selected as shown in FIG. 5. Thus, at the point of mouse release, if the selection path is sufficiently closed in shape a lasso enclosure is selected; otherwise, the selection rectangle 402 will be displayed and pixels in its region will be selected. Once the pixels are selected, with a label to represent the enclosed image section (e.g., in this case a handwriting graphic 206, which is identified by the color brown), enclosed arrow 600 of Figure is turned brown. Therefore, image 300 in FIG. 6 is entirely black except for the brown arrow designator 600.

Figure 7:
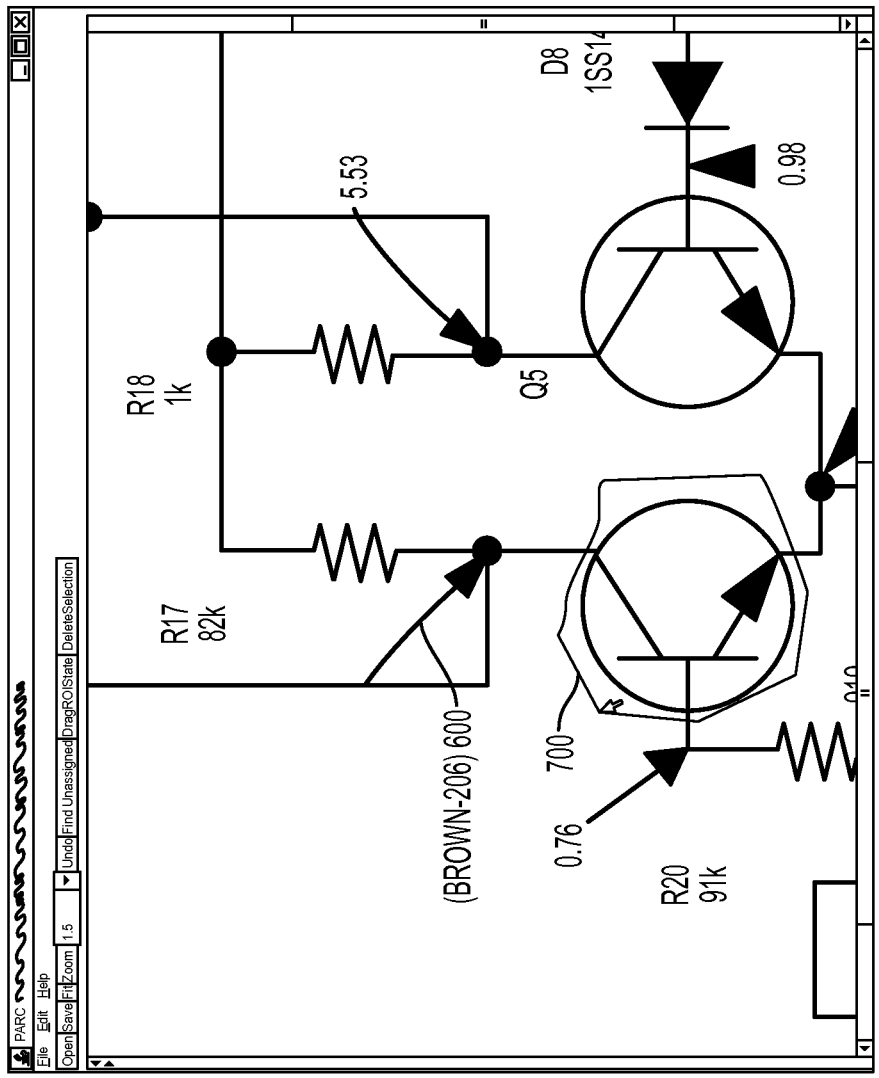
Figure 8:
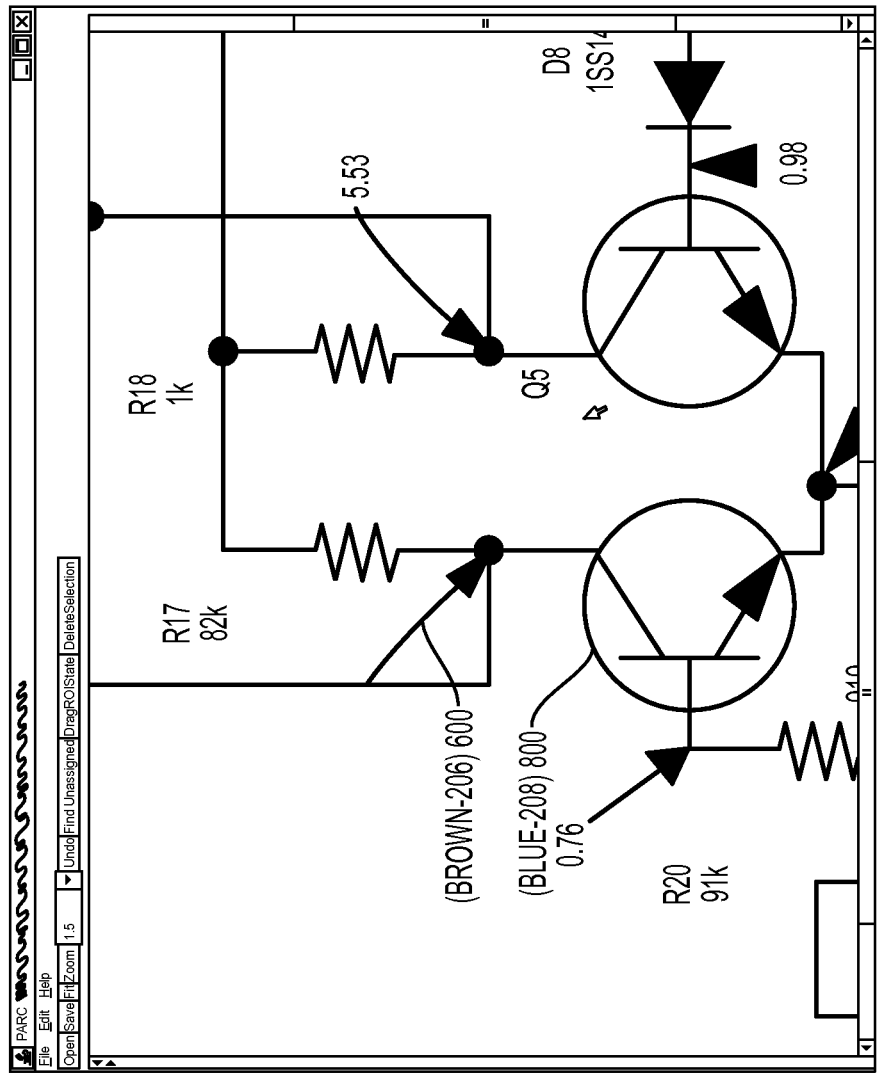

Turning now to FIG. 7, operation of polygon selection is illustrated. Particularly, double-clicking the mouse initiates a polygon selection state which enables region selection by dropping vertices of a polygon 700 using mouse clicks. Once the polygon 700 is formed (enclosing the image), the user selects the label this item is to be represented by, and for purposes of discussion, the selected color may be blue, representing machine print line graphic 208 of menu 200.

Figure 9:
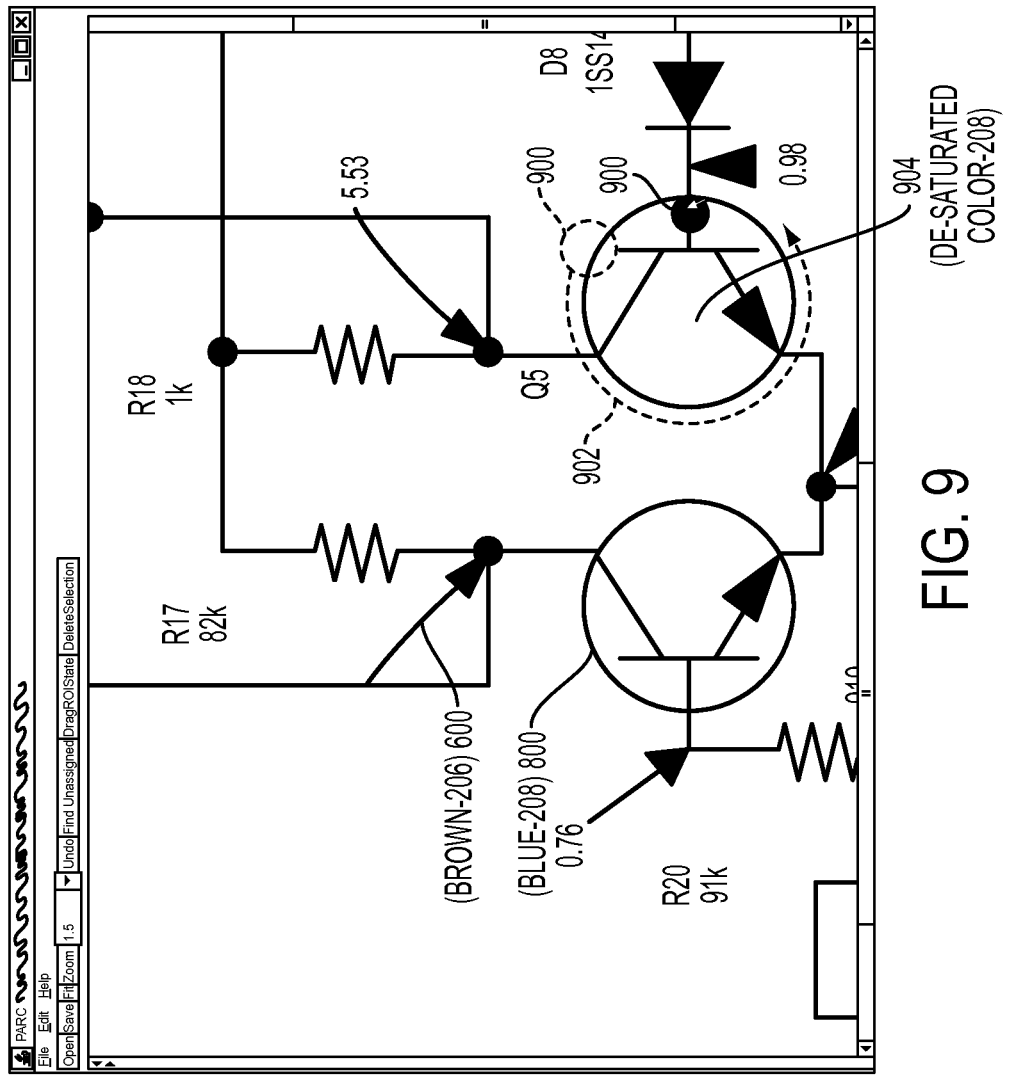
Figure 10:
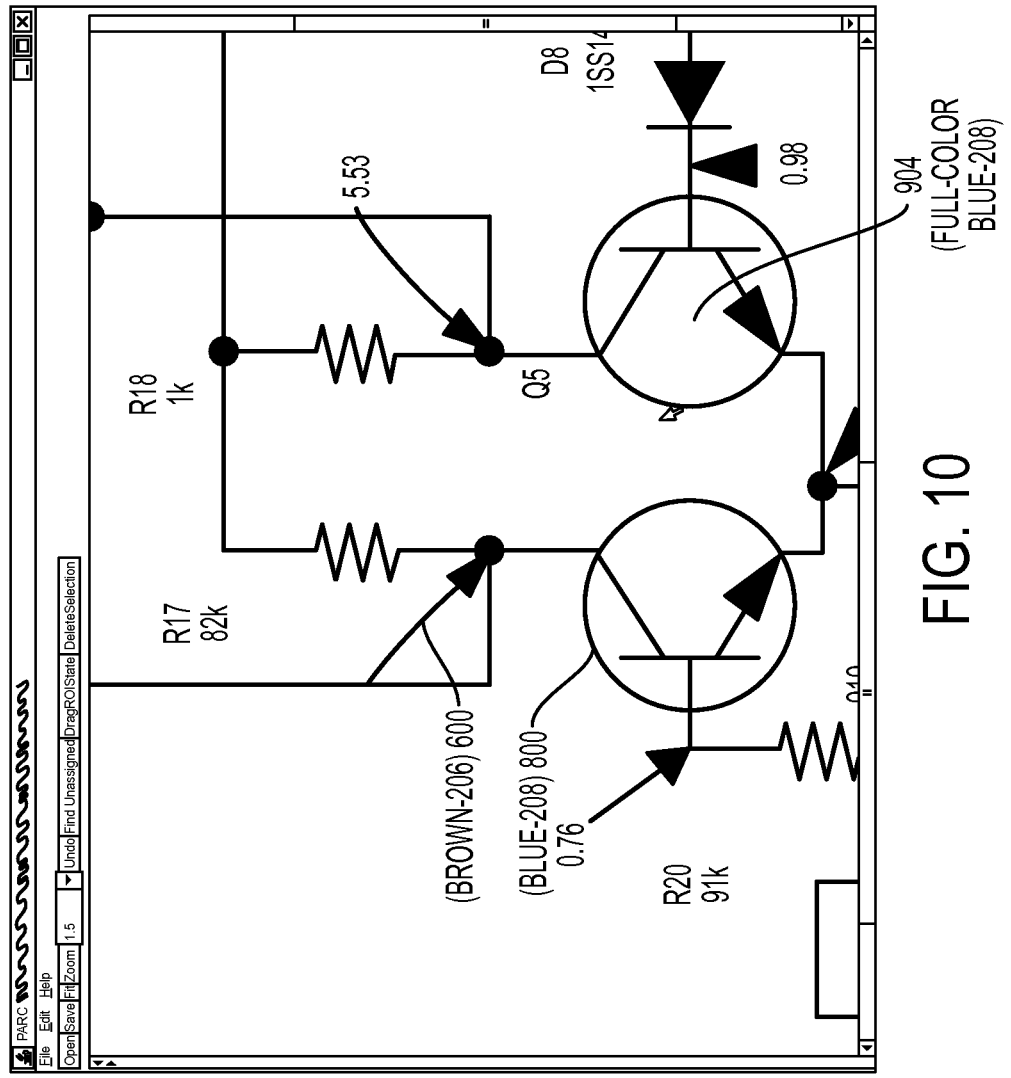

The second primary mode is Brush mode. Transitions between Region mode and Brush mode may be accomplished in this embodiment by pressing the space bar or clicking "Region/Brush" button 228 on the menu or a toolbar. In Brush mode, the cursor is replaced by a round or otherwise shaped "brush". In this mode, the label color is selected prior to movement of the brush (in this case the selected color is blue-208). Foreground pixels are selected when the brush is dragged over them (with the left mouse button held down). Operation in the brush mode is shown in FIG. 9, wherein the circular brush 900 starts at dotted location 900 and is moved by a user around the outer circumference of the image (i.e., a transistor schematic). In FIG. 9, brush 900 has not yet completed the path to the beginning portion (i.e., dotted line 900). However, once this is completed, and the brush then is moved over the interior representing machine print line graphic (i.e., blue) 208. It is to be understood the trace line 902 is simply provided for ease of understanding of how the brush system works. This line does not actually appear on the image in this embodiment.

1b. Tentative State

In both Region mode and Brush mode, after a user has selected a set of pixels, those pixels are displayed in the color indicating the selected label class. Immediately after any selection, though, the interface first enters a Tentative state and the selected pixels are indicated by an augmented appearance of the final color label. For example, the augmented appearance may be a desaturated color of the final color, some sort of pattern or texture or other identifier.

Figure 11:
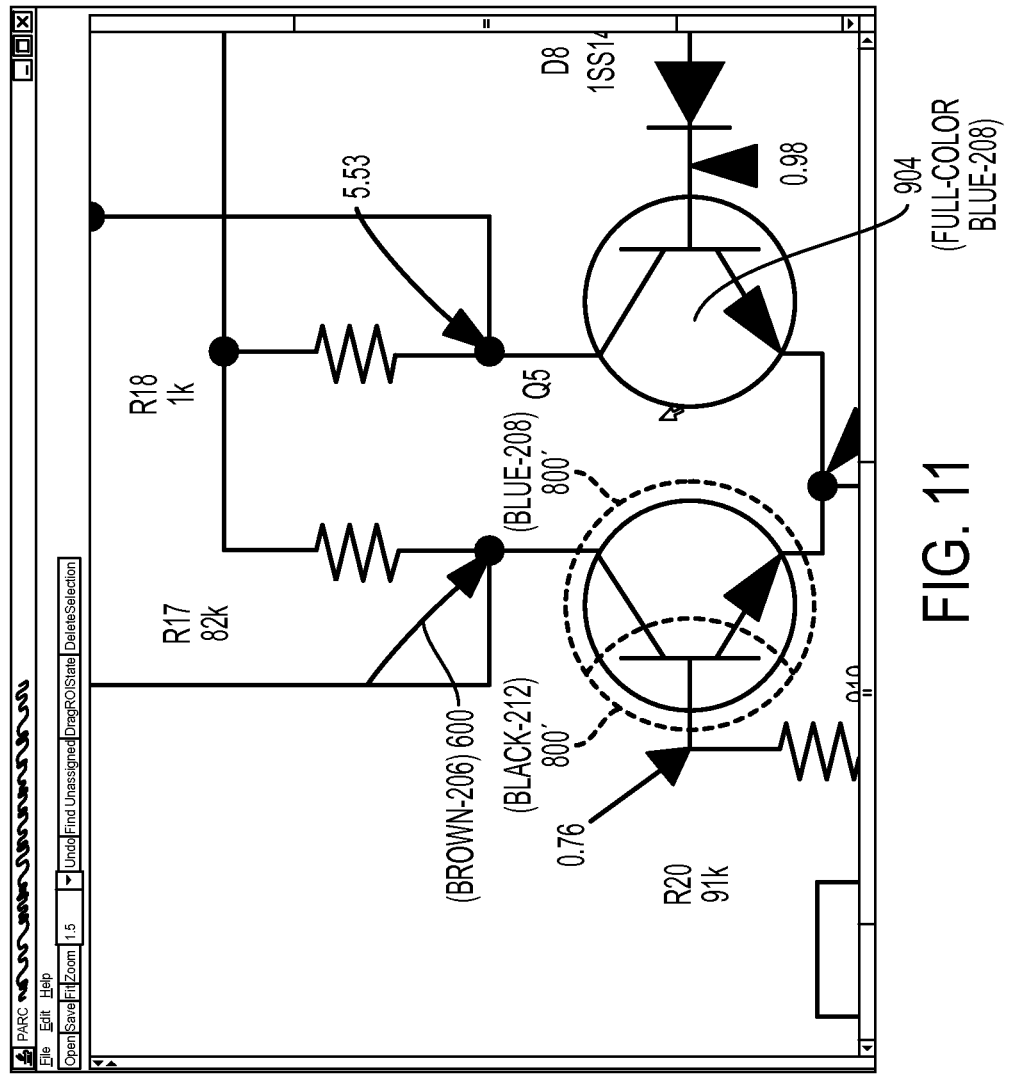

Tentative state permits the user to change the label (and associated color) of the selected pixels, before committing to that color. (However, even though there is a commit operation, it is always possible to undo any action, and no commitment of pixel labels is irreversible.) This is done in one embodiment by clicking the right button and selecting a different label (and associated color). Also, in Tentative state, the user can click the Undo button 266 on the menu 200 or a toolbar to reset the selected pixels to their prior labels, or unassigned status. Unlike the standard select-then-command paradigm of image editing tools, the labeling task is facilitated by combining both of these steps into a single operation. In user interface design terms, Tentative state is a quasi-mode that gives the user the opportunity to modify the label immediately after selecting material, but the state exits automatically and does not get in the way of rapid serial coloring commands. The undo concept is illustrated in FIG. 11, where a portion 800' of image 800, colored blue (208), has been enclosed, and then the undo button 800' is activated, returning section 800' to its previous state (i.e., black-212).

1c. Pixel Groups

Region mode also accesses several features of the labeler 112 based on automatic and manual establishment of groups of foreground pixels. Every time the user selects and labels a set of pixels in either Region or Brush mode, those pixels are remembered as a group that can be selected later with a single mouse click. Specifically, in labeler 112, if the cursor is positioned over a pixel that belongs to a group of commonly associated pixels, a "group command", (e.g., in one embodiment a Shift-Left-Click mouse command) selects all pixels of a group of foreground pixels that contains that pixel. This makes it easy for a user to do initial labeling work, then go back and change these labels for groups of pixels without tediously individually reselecting the pixels involved.

It is possible for a pixel to belong to multiple groups. These can be accessed in turn by successive "cycle identification commands" (e.g., Shift key-left mouse click commands). The set of groups are cycled through one at a time, each displayed in the current tentative label color.

1d. Automatic Detection of Group Structures

Pixel groups are created not only by manual region or brush-based selection, but also through automatic processes. In labeler 112, the user may invoke a "Recognize Structure" operation (i.e., button 230). Once selected automatic image processing is performed to form groups of pixels that correspond to perceptually meaningful elements of the document. In one embodiment of labeler 112, image processing techniques are used to detect horizontal and vertical lines and form these as groups. In a scratch image, horizontal and vertical lines are subtracted from the full image, and remaining connected components collected. Each connected component forms another pixel group that can be selected by point-and-click of labeler 112. The program architecture is extensible to other forms of structure recognition, including text lines and layout, to the extent automatic programs for detecting these groupings are available. In one embodiment such structure is accomplished as taught in co-pending U.S. Patent Publication No. 20110007970A1, to Saund, entitled, "System And Method For Segmenting Text Lines In Documents"; and U.S. Publication No. 20110007366A1, to Prateek et al., entitled, "System And Method For Classifying Connected Groups Of Foreground Pixels In Scanned Document Images According To The Type Of Marking", each incorporated herein by reference in their entirety.

Figure 12:
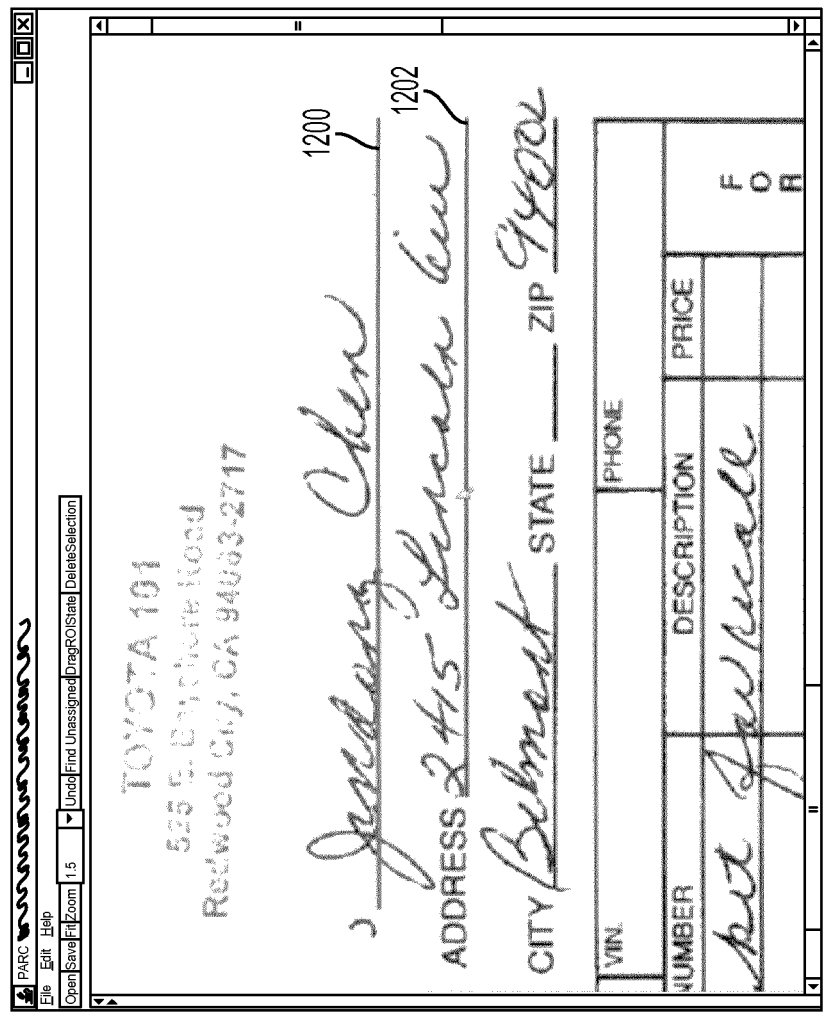
Figure 13:
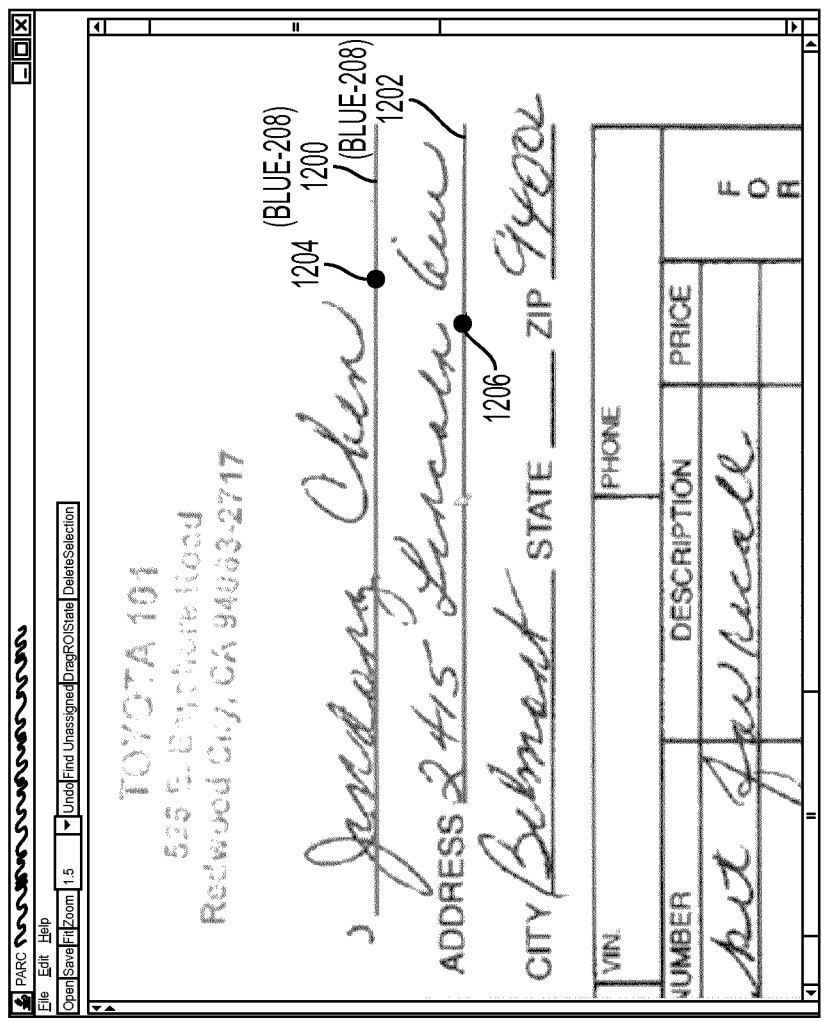

Illustrating the above group structure concepts, attention is directed to FIGS. 12 and 13. For example, once the structure has been recognized, such as straight line structures 1200 and 1202, a mouse click at any location (1204, 1206) along the line turns the entire line the color corresponding to the selected label color, such as a machine print line graphic (e.g., 208 blue). In other words, since the system recognizes the structure of the line, clicking at locations 1204 and 1206 turns the entire line 1200 and 1202 the appropriate label color.

1e. Bootstrapping

Fully automatic pixel labelers are in existence. Another feature of the present pixel labeler 112, is that pixel labels may be initialized by performing a bootstrapping process using an automatic pixel labeler. To accomplish this action, an automatic recognition algorithm is run on the initial image (or any user-selected region of it) and foreground pixels are colored with labels obtained by this algorithm. In implementation of labeler 112 which focuses on a user interface (UI) design and not recognition algorithms themselves, users may supply their own custom pixel label bootstrapping programs. In one embodiment such bootstrapping programs are in the form of a Java JAR file that includes a class that implements a simple interface.

1f. Unassigned Pixels

After a user has labeled a number of the foreground pixels in an image, it can be difficult for to detect pixels that have not yet been labeled, such as specs of background noise. Labeler 112 includes a "Find Unassigned Pixels (unassigned)" button on the toolbar. Activation of this button displays overlay ellipses over all connected components formed by all yet unlabeled pixels, making it easy for the user to detect.

1g. Layer Locking

Figure 14:
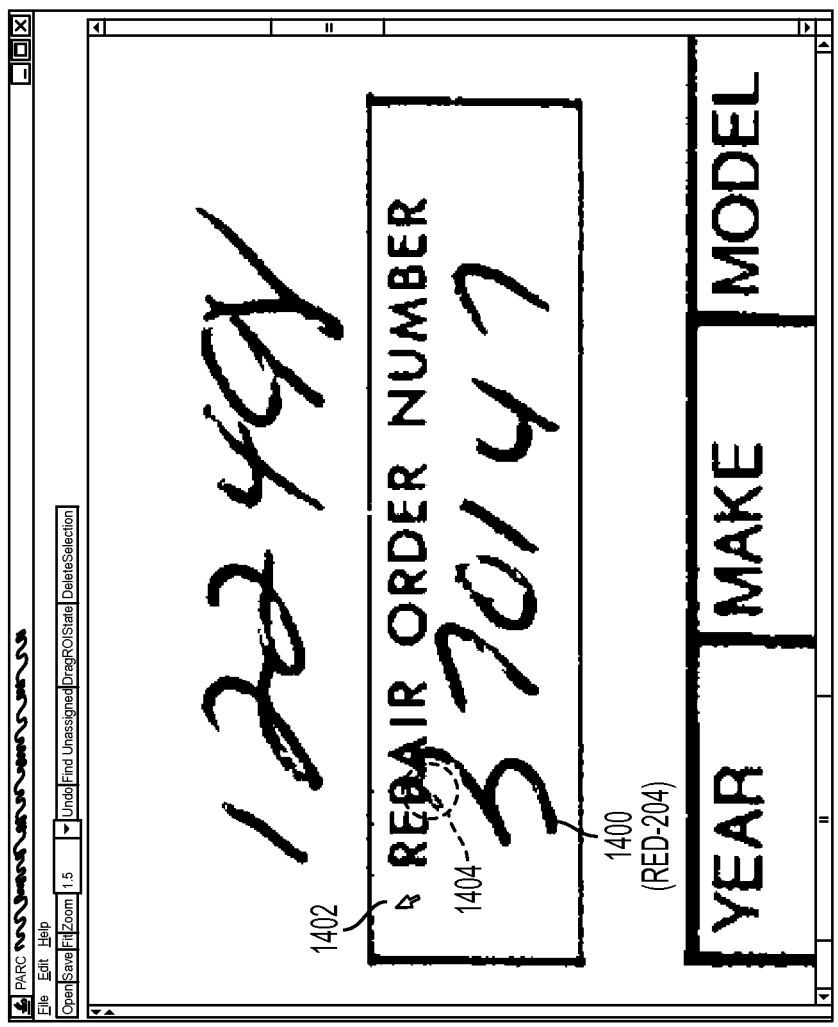
Figure 15:
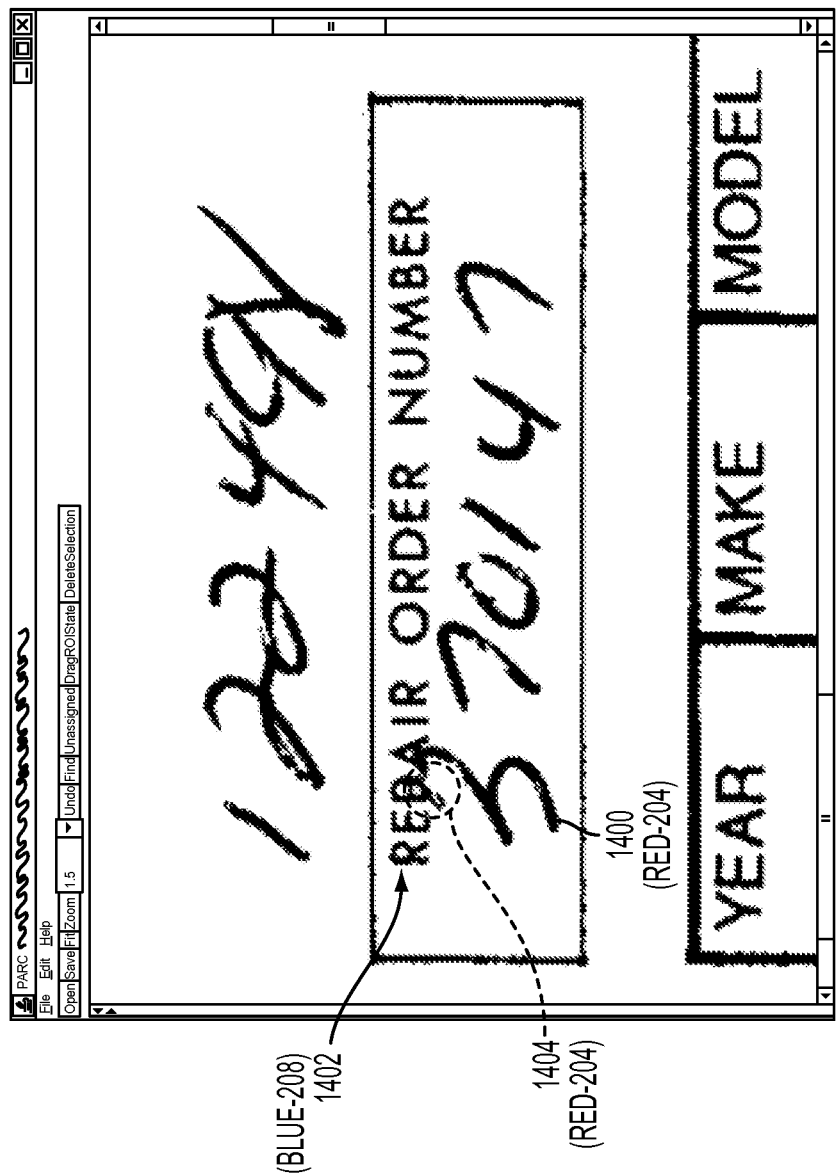

Labeler 112 includes a locking feature represented by "Lock All" button 224 of FIG. 2, which allows a user to "lock" any label (i.e., color) so that pixels already given this label cannot be changed. This makes it possible to label some pixels in a region, lock the pixels, and then label the remaining pixels in the region all at once through a large region selection operation (rectangle drag, lasso, or polygon, etc.). Turning to FIGS. 14 and 15, the concept of layer locking is illustrated.

For example, in FIG. 14, the handwritten text ("370147") 1400 has previously been highlighted as handwriting text 204 (i.e., red). Therefore, the numbers 370147 are entirely red. As can be seen, there is an overlap between these numbers and the machine print line graphic "REPAIR ORDER NUMBER" 1402. This overlap is designated 1404 in the drawing, and occurs between the "3" and "PA". Without layer locking, when the "REPAIR ORDER NUMBER" 1402 is colored, the section of "3" overlapping at 1404 would be turned to that new color label. However, previous to doing this additional highlighting or labeling, if the "Lock All" button 224 (of FIG. 2) is selected, the coloring of 1400 is maintained, even when labeler 112, attempting to change its color. This is shown most particularly in FIG. 15, wherein the "REPAIR ORDER NUMBER" has been changed to a machine print line graphic color (blue-208). However, the overlap 1404 of the "3" is maintained red, as does the remainder of the number "370147".

1h. Labeling Comparison

In order to ensure accuracy of groundtruth, it is desirable to have several users label a given image, then compare their output. Labeler 112 includes a groundtruth comparison feature. Users load multiple labelings of a given image, typically obtained by groundtruth efforts of other users or automated processes. Then a "Compare" function (button) 234 is invoked which visually indicates where the groundtruth labelings agree or disagree.

2. Implementation

Figure 16:
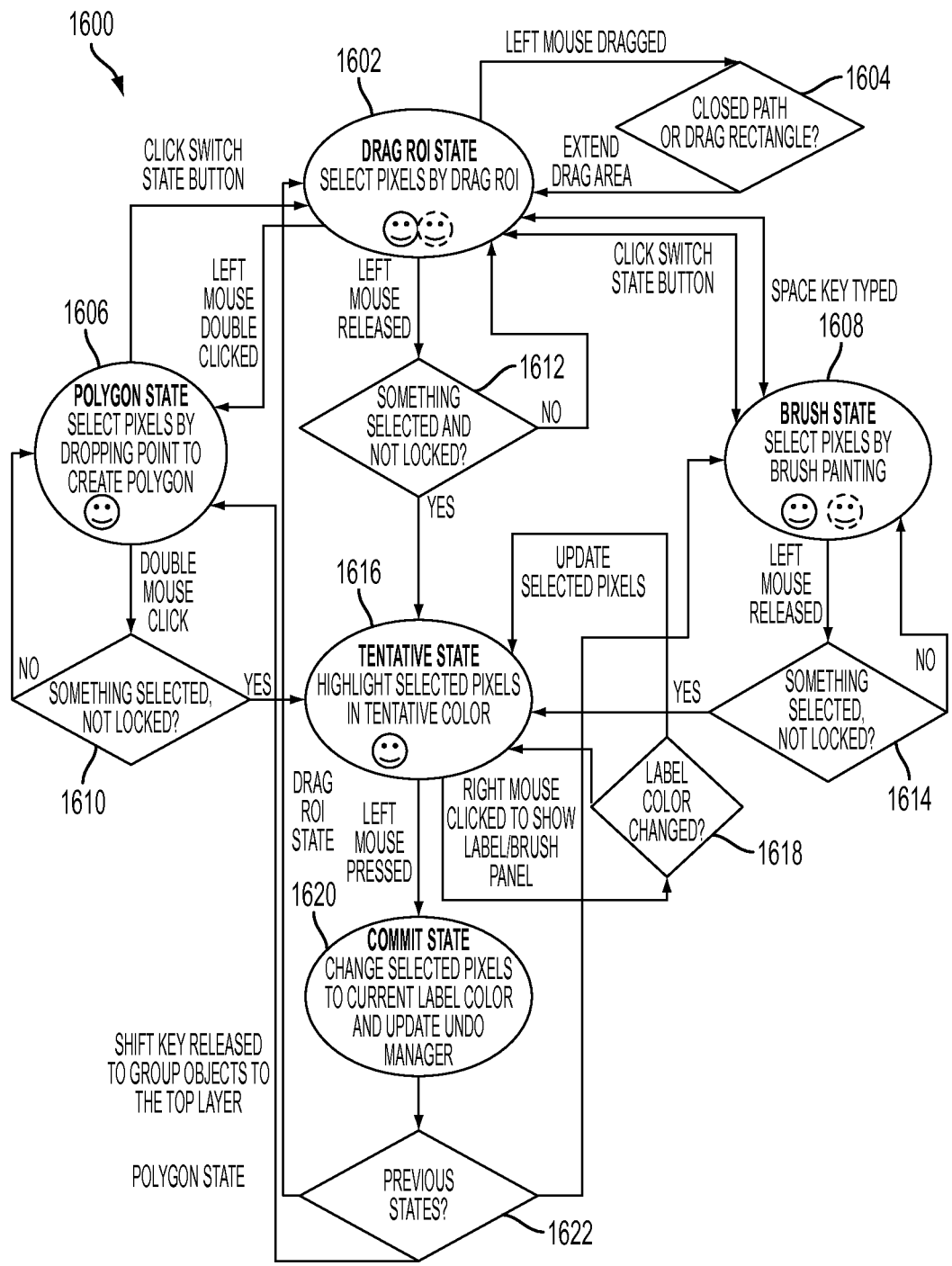
FIG. 16 is a state diagram of the pixel labeler, including main operations.

Labeler 112, in one embodiment, is implemented in Java/Swing, in about 40 custom classes on top of a larger image analysis toolkit. A portion 1600 of a state machine diagram of labeler 112 is presented in FIG. 16. Each selection/labeling operation creates a bitmap layer containing only foreground pixels selected and colored (or otherwise identified) at that operation. The collection of labeling operations forms a stack which is rendered onto a single-layer canvas that is seen by a user.

The output of a labeling operation is quite simple. In one embodiment it consists of an XML file listing the mapping from integer indices to label colors (integers) and their textual descriptions, and containing a CDATA block encoding the label-colored image itself in PNG format. For convenience of viewing, a separate standalone PNG image of the labeling is output as well.

Labeler 112 supports one label per pixel. In many document image applications it is desirable for image elements to adopt several labels representing, for example, a handwritten signature that overlaps a machine-printed baseline, or the word, line, and paragraph membership of a glyph. This capability is architecturally compatible with labeler 112.

The state diagram portion 1600 starts with the labeler in a Drag ROI State 1602 which handles mouse drag selection of either rectangle or closed path regions 1604. A left mouse release ends the selection. The Polygon State is entered by a double left mouse click 1606. Once in the polygon State mouse selection of a polygon area is handled by single left mouse clicking dropping vertex points and double mouse clicking to close up the polygon and exit to Drag ROI State. The Brush State 1608 handles brushing via left-mouse drag. A right click will bring up the label brush panel (e.g., of menu 202) where brush size and color can be chosen. A left mouse release will end the current brushing. A space key press toggles between the Brush State and the Drag ROI State. On a labeler tool bar, a Switch State button is provided. The State Switch button displays the current state of labeler 112. When clicked, the Switch State button also switches between states in the order of Polygon—Drag ROI—Brush state.

Once pixels are selected through the above events (i.e., "yes" something selected not locked) 1610, 1612, 1614, they are colored as a current tentative label color, which is a pre-calculated less saturated version of a final label color. This indicates that the labeler is in a Tentative State 1616. At this point, right clicking the mouse brings up the Label Brush Panel to allow a changing of the label color of the current selected pixels 1618. Any other mouse event or keyboard event will end the Tentative State, and commit the current selection 1620, and create a new layer with selected label color painted on top of the canvas. The labeler then returns to the previous state 1622, such as Drag ROI, Polygon, Brush or Select State.

The above illustrates particular features of labeler 112. It is to be appreciated that labeler 112 has additional capabilities, such as shown in state diagram 1700 of FIG. 17. Here it is seen that the UI process of labeler 112 starts from an initiate (Init) State 1702 in which all mouse event and buttons are disabled. Upon a file load, the user interface (UI) labeler enters Drag ROI State (1602) whereafter processes of FIG. 16 may be undertaken.

There are also some common mouse listeners, such as mouse wheel listener to zoom in and out 1704, mouse motion listener to indicate mouse location and to change cursor when there are objects under the mouse 1706. These listeners are shared by the relevant states. They are illustrated by the circles at the top right corner.

Figure 17A:
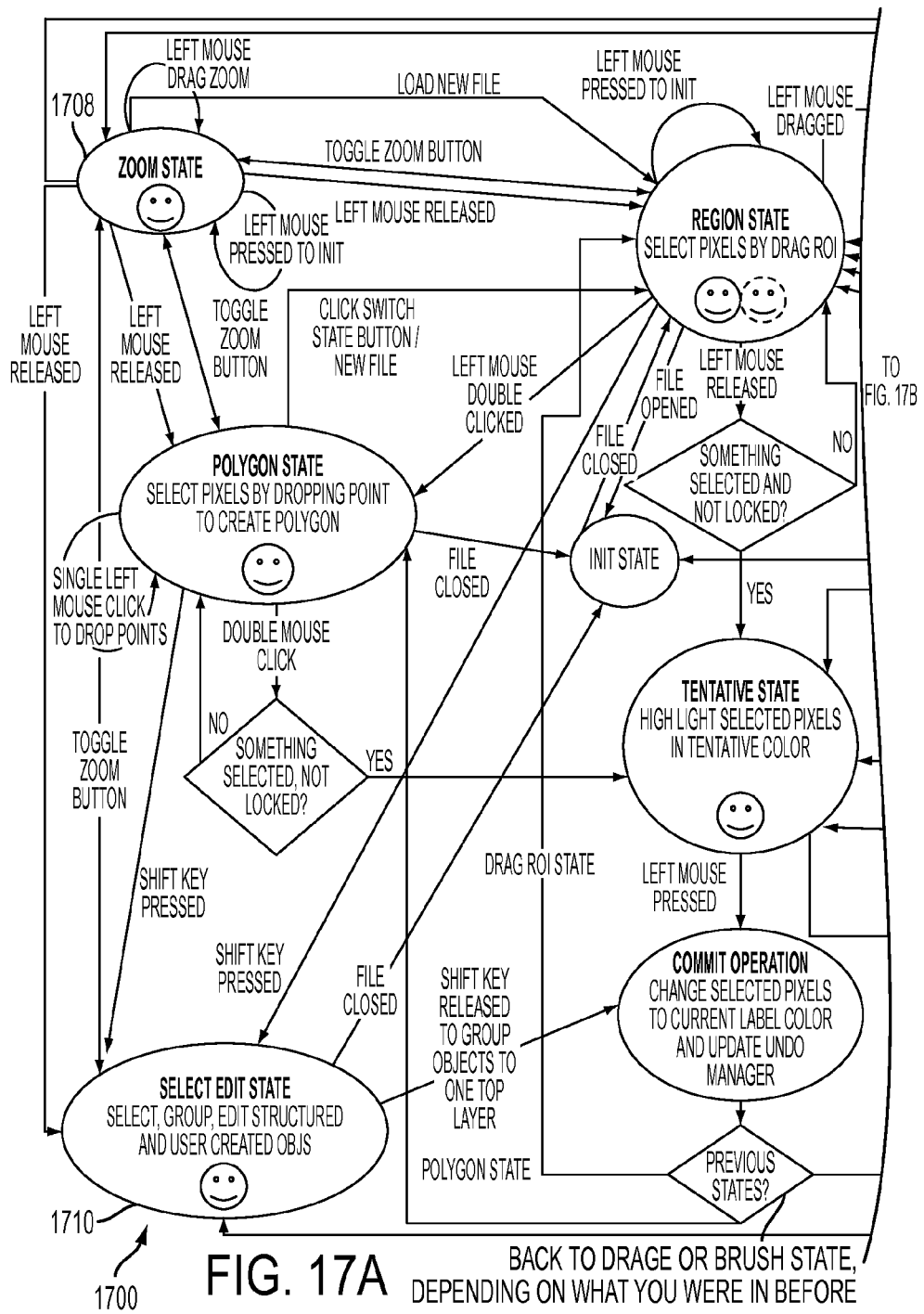
FIG. 17 depicts additional operations in addition to those shown in FIG. 16.
Figure 17B:
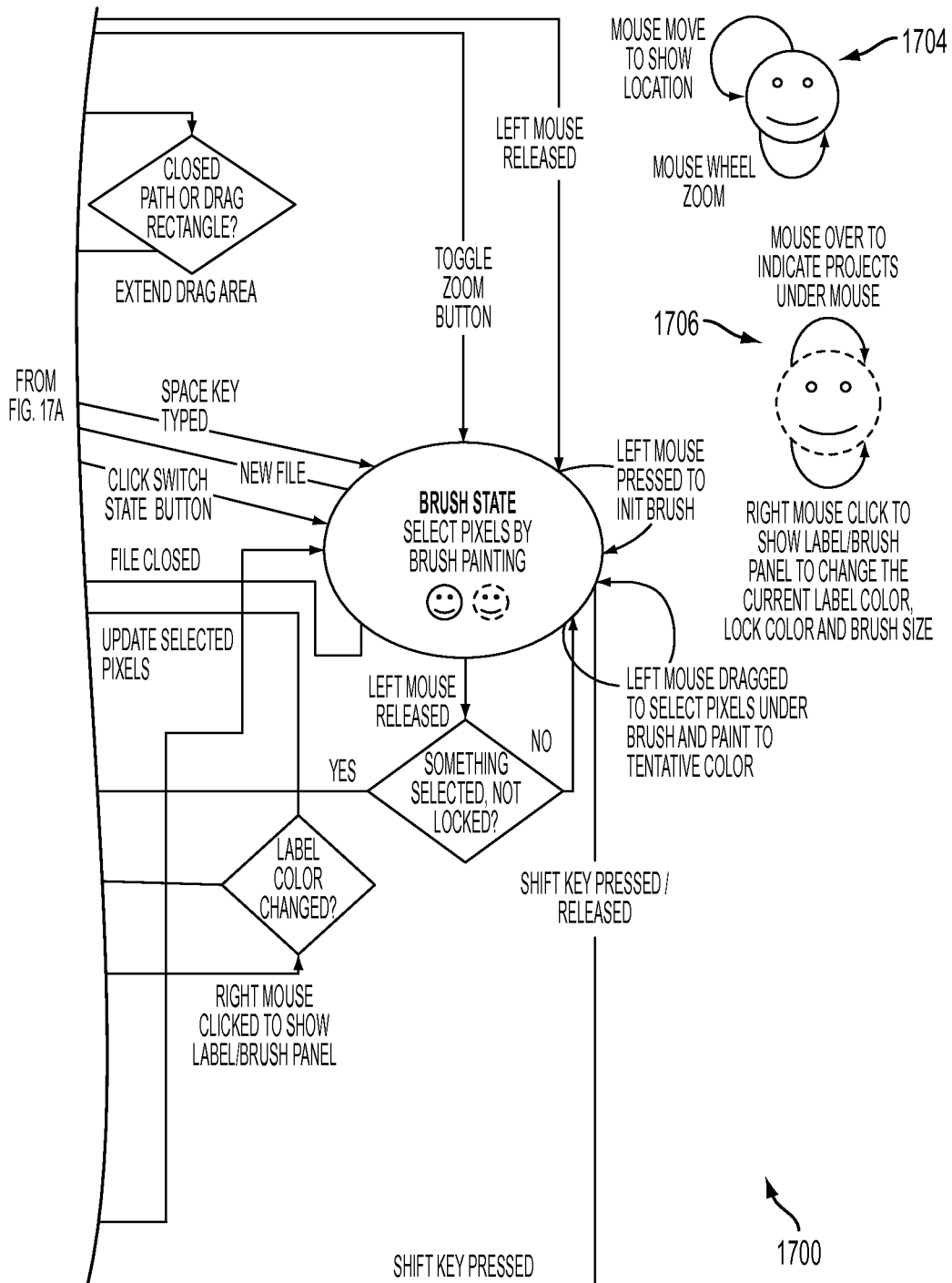

Zoom state 1708 in the state diagram handles zoom by a left mouse drag of a zoom region. It can be accessed by clicking a Zoom button 236. A mouse release results in an exit of the zoom state and the labeler goes back to the previous state. FIG. 17 also includes select edit state 1710, discussed in more detail in FIG. 18.

Figure 18:
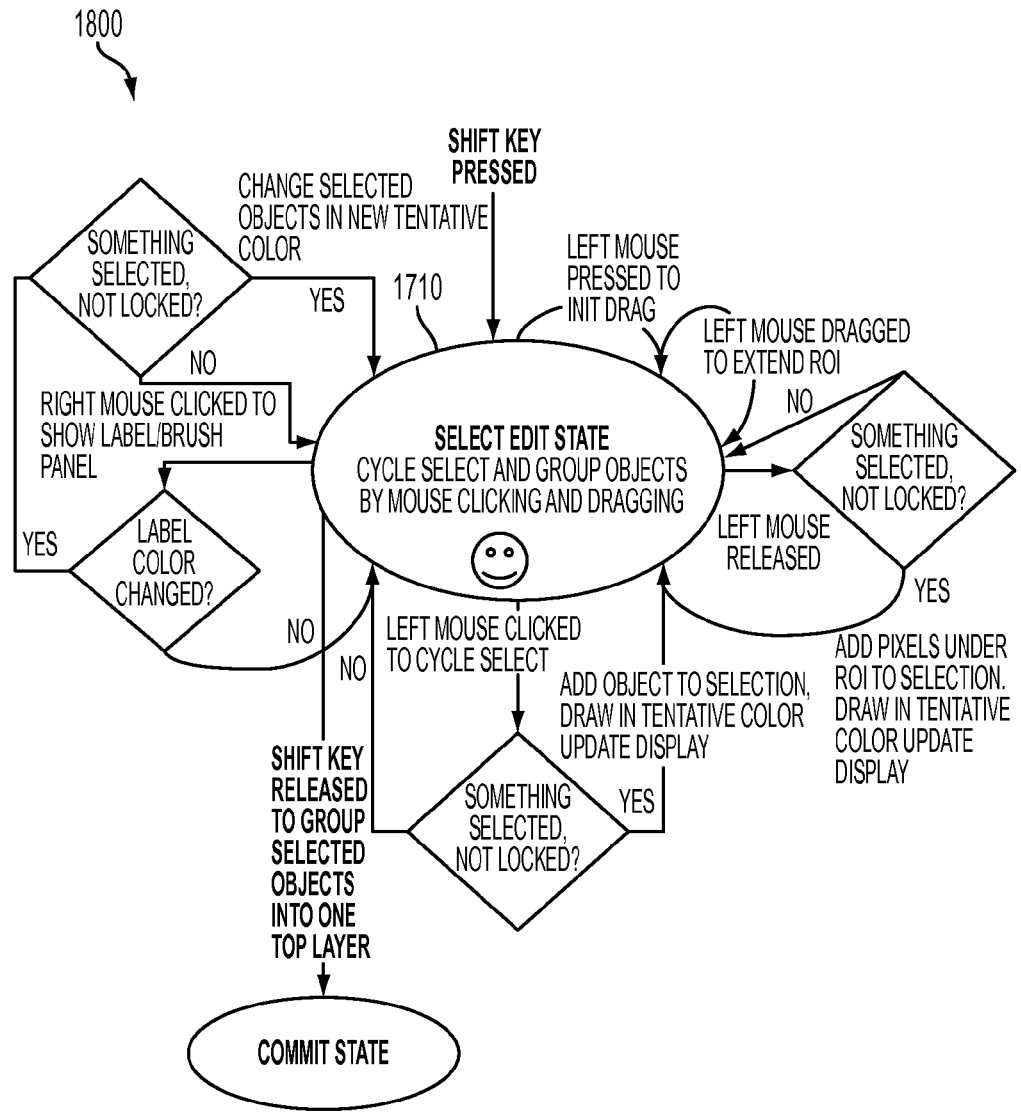
FIG. 18 depicts the state operations for the select edit state of FIG. 17.

FIG. 18 illustrates Select edit state 1710 and surrounding operations 1800 in more detail. A Shift-Left mouse click can serve as two kinds of selections. One is cycling through different layers located under this current mouse location. Second, if the mouse moves to a new location and selects a different layer, it will group selected layers into one group which later can be selected at one time. Each time layers are selected and/or added to the current selection group, the layers are all changed to the current label tentative color and are in tentative mode which allows modification or deletion. A Shift key release will end the select state and commit the changes.

Figure 19:
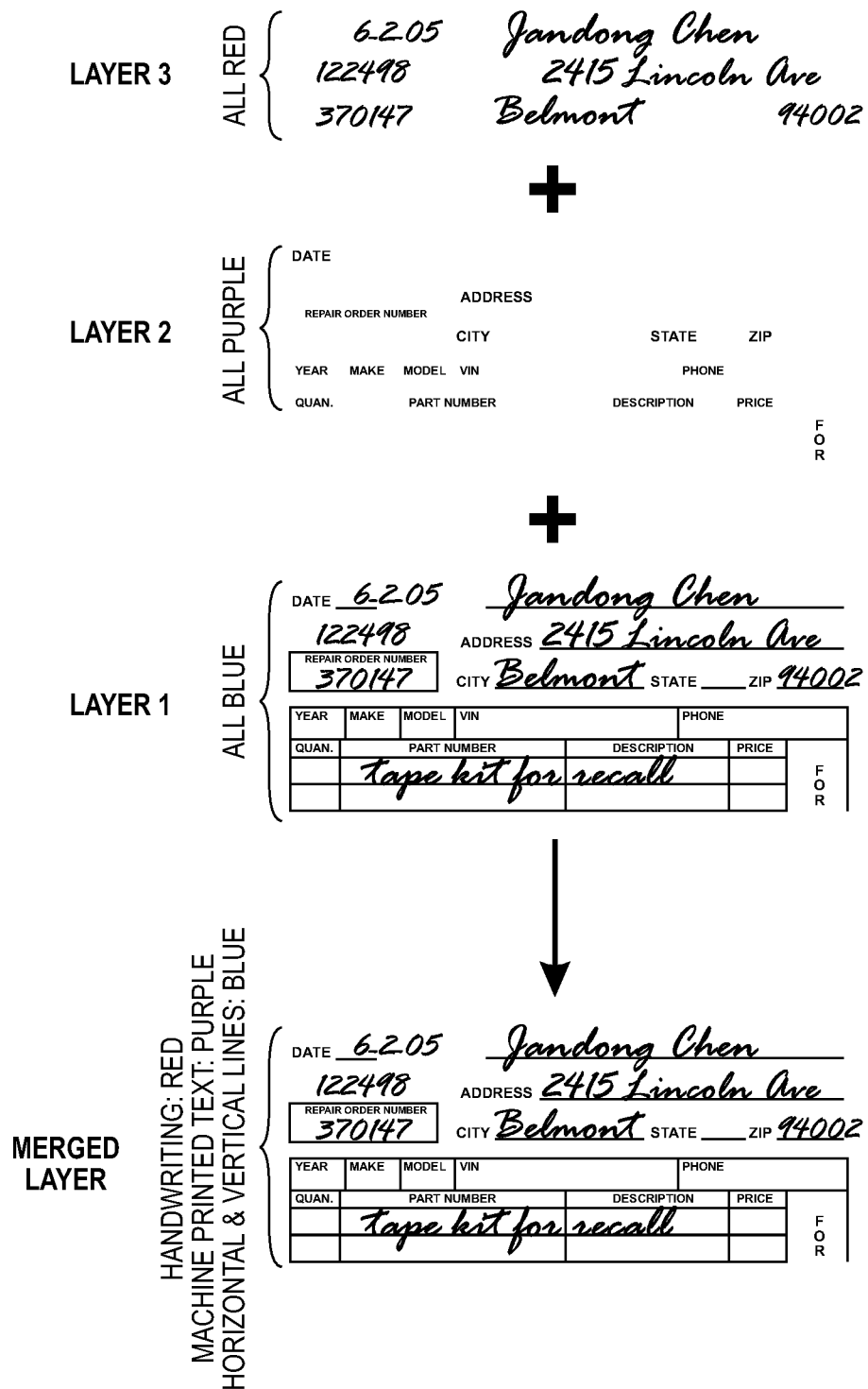
FIG. 19 shows the multi-layer concepts of the present application.

As illustrated in FIG. 19, each time an action occurs which causes parts of the image to change label (color), a new layer is created and is painted on top of the canvas bitmap, as illustrated in FIG. 19 below. In this example, layer one was created by mouse dragging a rectangle area. Layer two was created by shift+mouse dragging selection of multiple connected component objects. Layer three was created by brushing the handwritten part of the pixels. The layers are all painted onto canvas bitmap to form the final result.

Further options of labeler 112 include: Smart brush: A user click on a foreground pixel can allow flood-filling of connected foreground pixels up to a maximum distance. This would be an approximate algorithm for "stroke following". This is different from painting with a wide brush, because the brush may cover proximal strokes that are not (locally) connected and need different labels. The maximum extent of the flood fill need not be predetermined. It can be increased or decreased by the mouse-wheel, with dynamic feedback to the user. Alternatively, the flood-fill can be performed in relative slow animation so that the user can just keep the mouse button pressed to keep flooding more connected pixels. The latter is good for pen interfaces. In addition, it may be useful to limit the flood-filling also to a directional "cone" to avoid contaminating crossing strokes.

Active brushes: Brushes that change pixel colors or not based on analyzing the covered pixels. E.g., a special brush can color pixels only if 50% or more of the active brush covers foreground pixels. Median filter brushes: for finishing touch ups. A median filter brush may color covered pixels only if a certain percentage participate in long foreground runs.

This system and method vastly reduces the labor required to label document images on a pixel-by-pixel basis. This is accomplished in one embodiment through the combination of user interface design targeted to this task, and through the leveraging of automatic recognition technologies that bootstrap the process to establish perceptually significant groups of pixels that the user can then label with direct point-and-click operations.

While the foregoing has described the labeler interacting with a computer mouse, other arrangements are possible. For example, one variation is that the labeler user interface is implemented using a pen/stylus rather than a mouse.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A groundtruth user interface labeler embodied on a non-transitory computer readable medium and executable on a computer, the user interface comprising:
    a labeling mechanism for assigning labels on a pixel basis to only foreground pixels of an image stored in a computing environment; and
    a tentative operation mode permitting the assigned labels to be changed after pixels have been selected but not committed to by a user;
    wherein selected pixels in the tentative operation mode are displayed with a tentative label appearance, the tentative label appearance having an augmented appearance of a final label appearance, and wherein both the tentative label appearance and the final label appearance indicate a same label of the selected pixels.

2. The user interface according to claim 1, wherein pixel selection is accomplished using either a region mode or a brush mode, the region mode configured to select pixels by enclosure of the selected pixels, and the brush mode configured to select pixels in a painting operation.

3. The user interface according to claim 1, wherein the labels identify handwritten text, machine print text, machine print graphics and speckle noise.

4. The user interface according to claim 1, further including a bootstrapping facility, which permits other labeling systems to operate with the labeler.

5. The user interface according to claim 1, wherein groups of pixels may be selected for labeling at a same time by a point and click command.

6. The user interface according to claim 1, wherein the labeling mechanism creates an image layer for each group of pixels that is labeled, and wherein image layers created by the labeling mechanism are individually modifiable.

7. The user interface according to claim 1, wherein groups of pixels are formed dynamically by user selection actions.

8. The user interface according to claim 1, wherein groups of pixels are formed through automatic recognition algorithms.

9. The user interface according to claim 1, further including a locking operation wherein pixels already labeled are locked to not be altered by additional labeling operations.

10. The user interface according to claim 1, wherein multiple labeling outputs are compared and differences highlighted.

11. A groundtruth user interface labeler embodied on a non-transitory computer readable medium and executable on a computer, the user interface comprising:
    a labeling mechanism for assigning labels on a pixel basis to only foreground pixels of an image stored in a computing environment;
    a grouping mechanism for forming groups of pixels that may be selected for labeling at a same time, wherein a pixel may belong to one or more groups of pixels which are stored in memory as image layers, and wherein the groups of pixels are formed dynamically by user selection actions and/or by automatic recognition algorithms, wherein the labeling mechanism creates an image layer for each labeled group of pixels;
    a rendering mechanism rendering a plurality of image layers created by the labeling mechanism onto a single-layer canvas displayed to a user, the plurality of image layers individually modifiable.

12. The user interface according to claim 11, further including:
    a tentative operation mode permitting the assigned labels to be changed after pixels have been selected but not committed to by a user.

13. The user interface according to claim 11, wherein pixel selection is accomplished using either a region mode or a brush mode, the region mode configured to select pixels by enclosure of the selected pixels, and the brush mode configured to select pixels in a painting operation.

14. The user interface according to claim 11, wherein the labels identify handwritten text, machine print text, machine print graphics and speckle noise.

15. The user interface according to claim 11, wherein selection in the tentative selection operation, generates a tentative label color which has an augmented appearance of a final label color, wherein the final label color is displayed when the commitment is made to the selection made in the tentative operation.

16. The user interface according to claim 11, further including a bootstrapping facility, which permits other labeling systems to operate with the labeler.

17. The user interface according to claim 11, wherein the groups of pixels may be selected for labeling at a same time by a point and click command.

18. The user interface according to claim 11, wherein groups of pixels are formed through automatic recognition algorithms.

19. The user interface according to claim 11, further including a locking operation wherein pixels already labeled are locked to not be altered by additional labeling operations.

20. The user interface according to claim 11, wherein multiple labeling outputs are compared and differences highlighted.

21. A system comprising:
    a memory;
    a processor coupled to the memory; and
    a plurality of instructions stored in the memory and executed by the processor to present a groundtruth user interface labeler to enable a user to label groundtruths of an image, the user interface comprising:
- a labeling mechanism for labeling only foreground pixels in an image stored in a computing environment; and
- a grouping mechanism for forming groups of pixels that may be selected for labeling at a same time, wherein a pixel may belong to one or more groups of pixels which are stored in memory as image layers, and wherein the groups of pixels are formed dynamically by user selection actions and/or by automatic recognition algorithms;
- wherein the labeling mechanism creates an image layer for each group of pixels that is labeled, and wherein image layers created by the labeling mechanism are individually modifiable.

22. The system according to claim 11, further including a tentative operation mode permitting assigned labels to be changed after pixels have been selected but not committed to by a user, wherein selected pixels in the tentative operation mode are displayed with a tentative label appearance, the tentative label appearance having an augmented appearance of a final label appearance, wherein both the tentative label appearance and the final label appearance indicate a same label of the selected pixels.

23. The system according to claim 21, further including a tentative operation mode permitting assigned labels to be changed after pixels have been selected but not committed to by a user, wherein selected pixels in the tentative operation mode are displayed with a tentative label appearance, the tentative label appearance having an augmented appearance of a final label appearance, wherein both the tentative label appearance and the final label appearance indicate a same label of the selected pixels.

* * * * *